Nov. 9, 1971    I. ERLICHMAN    3,618,493
PHOTOGRAPHIC APPARATUS

Filed May 4, 1970    7 Sheets-Sheet 1

INVENTOR.
IRVING ERLICHMAN
BY Brown and Mikulka
and
Robert E. Corb
ATTORNEYS

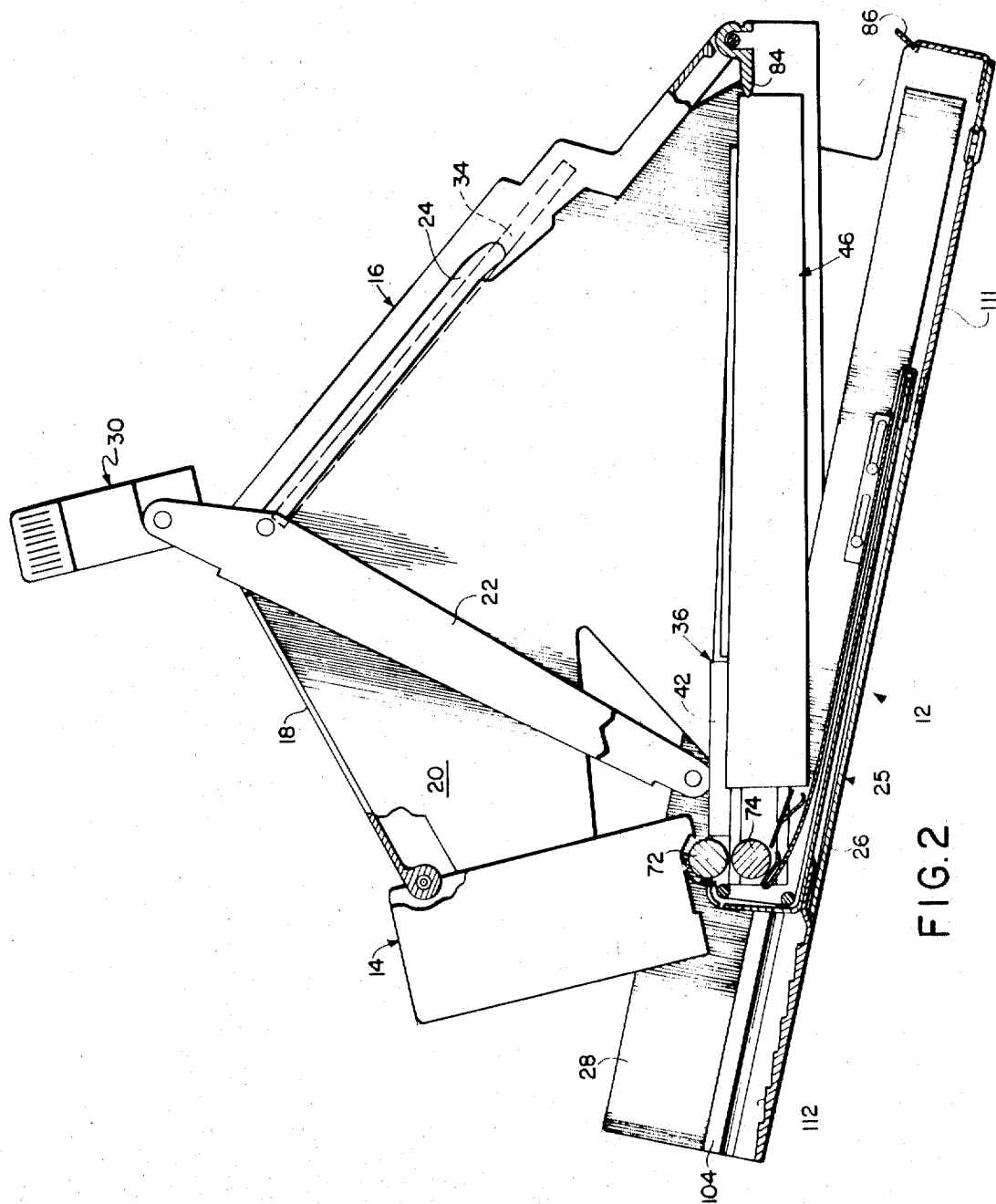

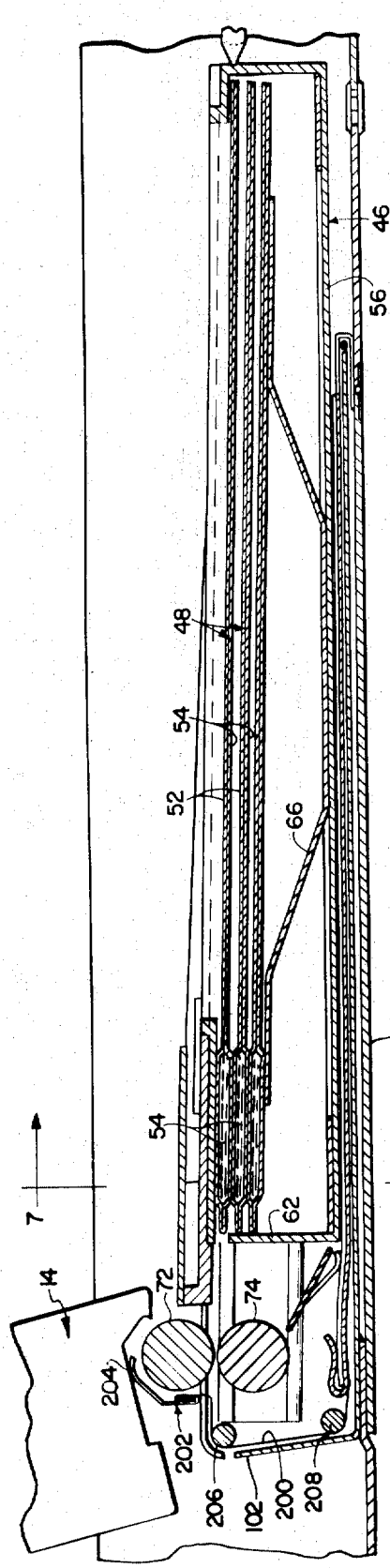
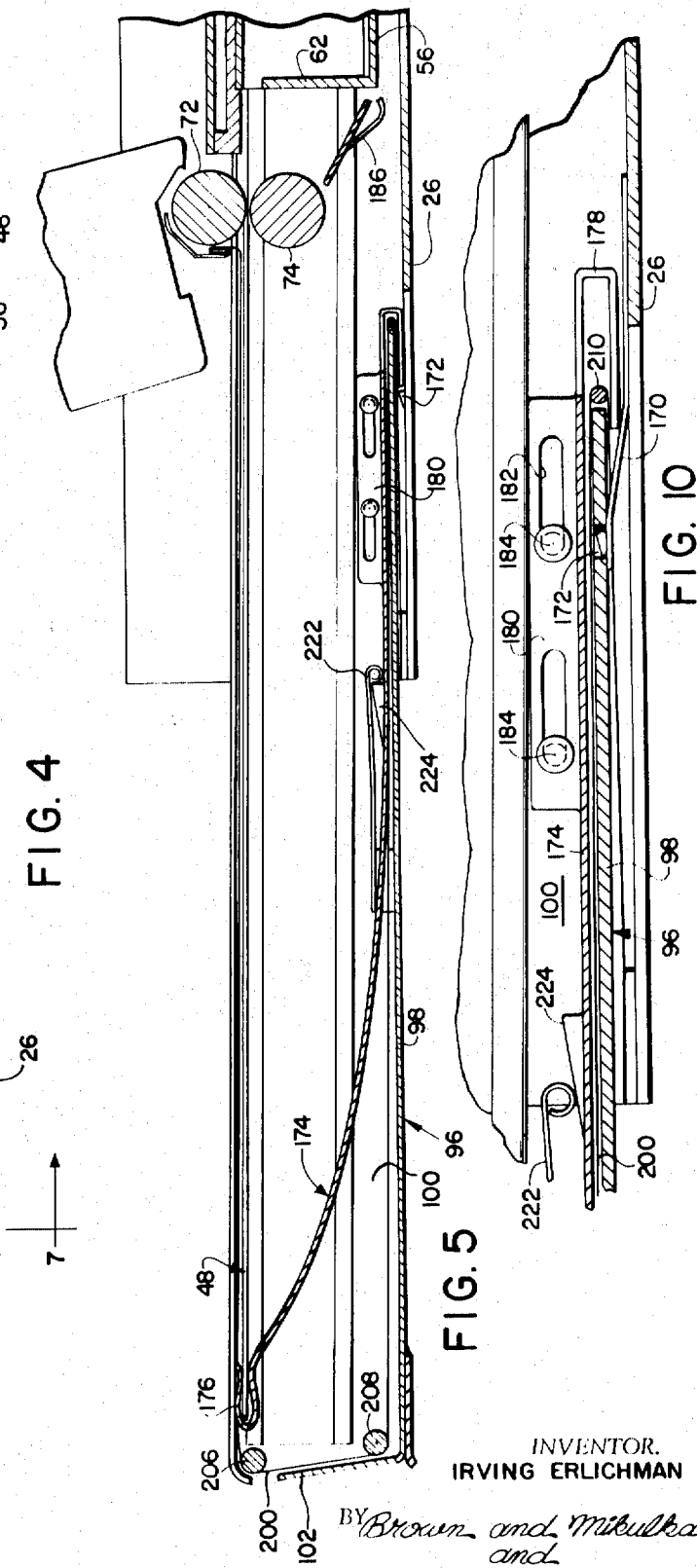

Nov. 9, 1971    I. ERLICHMAN    3,618,493
PHOTOGRAPHIC APPARATUS
Filed May 4, 1970    7 Sheets-Sheet 4

INVENTOR.
IRVING ERLICHMAN
BY Brown and Mikulka
and
Robert E. Corb
ATTORNEYS

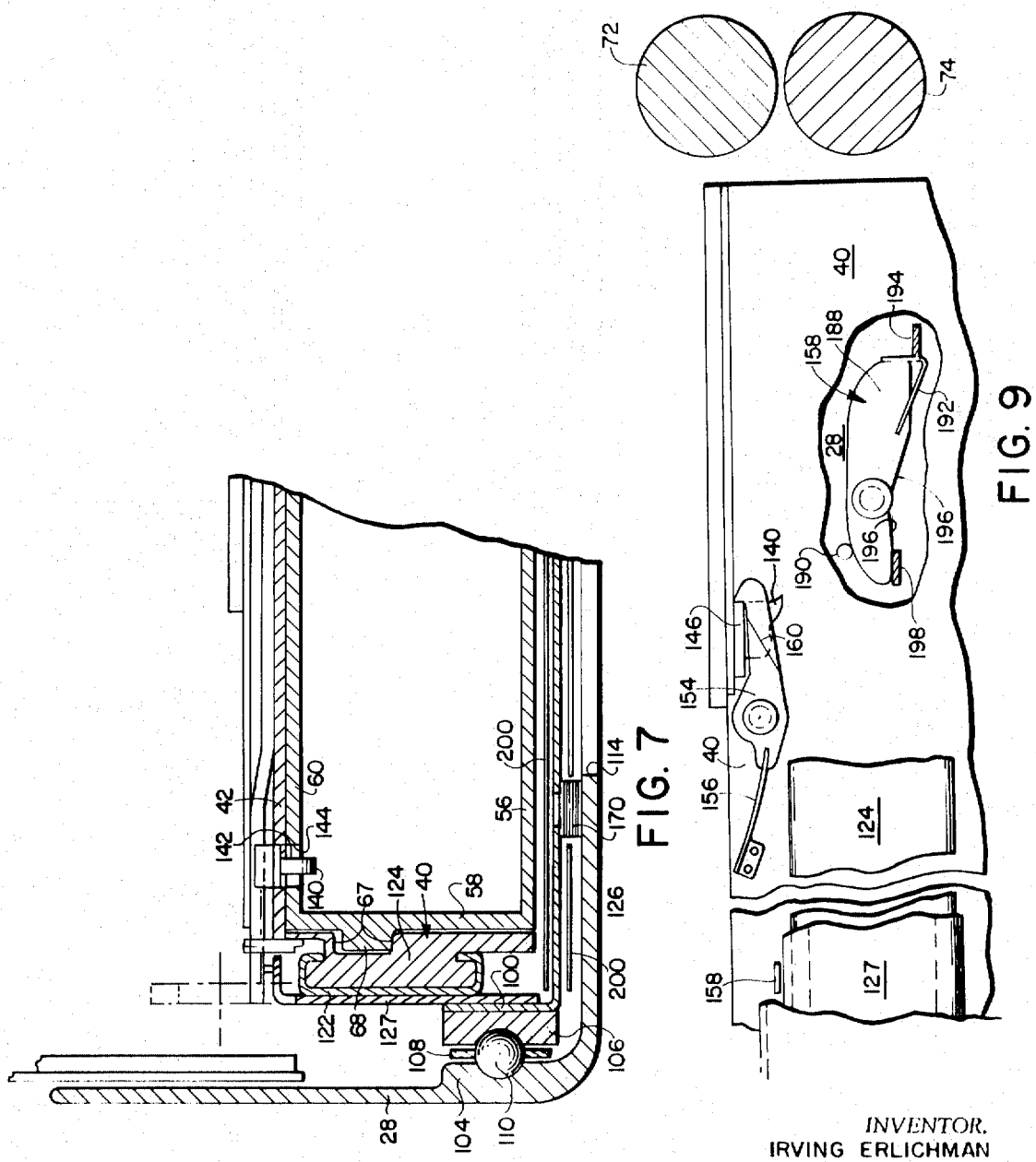

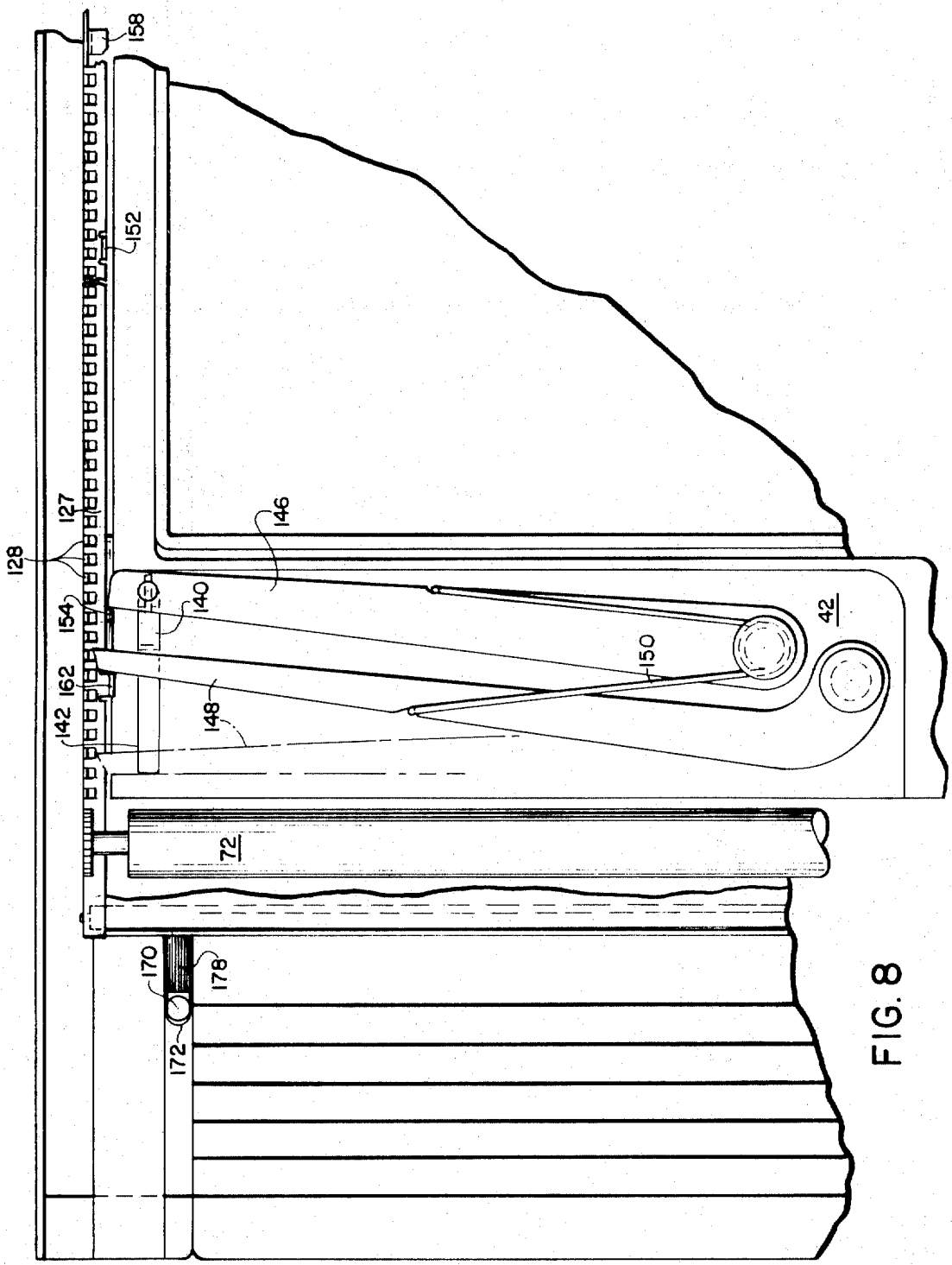

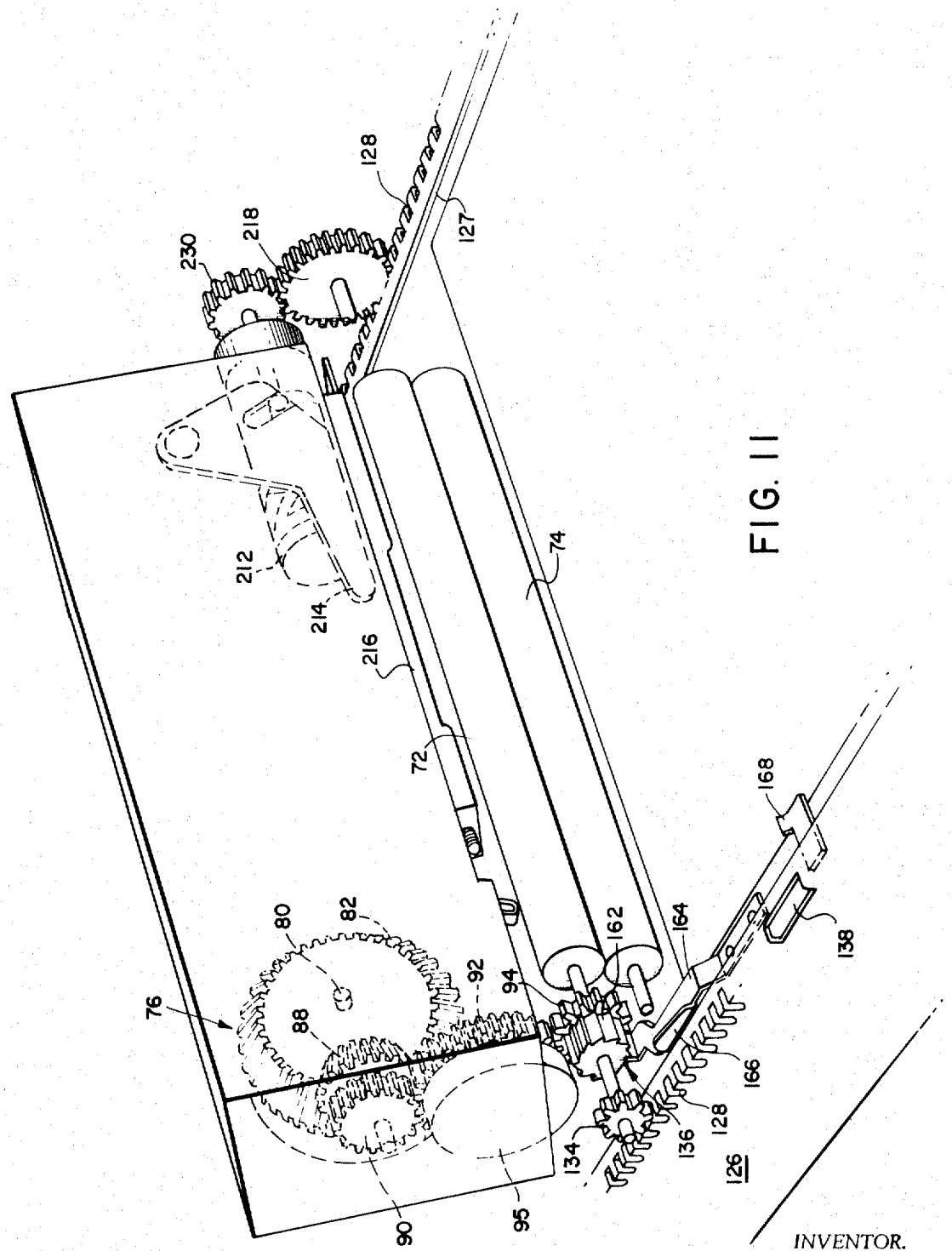

3,618,493
PHOTOGRAPHIC APPARATUS
Irving Erlichman, Wayland, Mass., assignor to
Polaroid Corporation, Cambridge, Mass.
Filed May 4, 1970, Ser. No. 34,181
Int. Cl. G03b 17/52
U.S. Cl. 95—13                              34 Claims

ABSTRACT OF THE DISCLOSURE

A self-developing camera comprising a film transport and processing system including a pair of pressure applying rollers rotatable to advance a film unit therebetween and distribute a processing liquid within the film unit, a film feeding device for moving a film unit from exposure position into the bite of the rollers and a drawer adapted to be reciprocated manually to operate the film feeding device and tension a spring drive for rotating the rollers. The drawer is designed to transport a film unit to a storage position following distribution of the processing liquid and provide an expandable, light-free environment for the film unit during movement thereof. The camera also includes an exposure system which is preset, prior to exposure, by manual movement of the drawer.

---

In the copending U.S. patent application of Irving Erlichman, Ser. No. 179, filed Jan. 2, 1970, entitled Photographic Apparatus, there is shown and described photographic apparatus adapted to take the form of an extremely compact—relative to image size—self-developing camera or camera back. Such apparatus is adapted to be employed with a photographic film assemblage or film pack comprising a container and a plurality of self-developing film units mounted within the container in stacked relation with the forwardmost film unit located in position for exposure. Each film unit includes a photosensitive element located in face-to-face relation with another element and a rupturable container attached to the elements in position to dispense its liquid contents between the elements in response to the application of compressive pressure to the rupturable container. The camera includes means for exposing each film unit within the container of the film pack to form an image in the film unit and advancing the film unit from the container, leading end foremost, between a pair of pressure-applying members which eject the liquid contents of the container between the elements and distribute the liquid between the elements to initiate formation of a visible image within the film unit.

A camera or camera back of this type includes a housing providing a light-free environment for a film pack and components of the apparatus adapted to process a film unit following exposure thereof. The camera is preferably automatic in its operation and includes, within the housing, means for holding a film pack with the forwardmost film unit located in position for exposure; processing means in the form of a pair of juxtaposed pressure-applying rollers biased toward one another and adapted to be rotated with a film unit engaged therebetween to move the film unit leading end foremost while distributing a processing liquid from the container between the elements of the film unit; and film advancing means for engaging the forwardmost film unit and moving the leading end into the bite of the pressure-applying rollers which continue the movement of the film unit in the same direction from the housing through an opening therein.

The camera also comprises a film transport system including a reciprocating drawer movable from an initial position within the housing through the same opening as the film unit and a curtain cooperating with the drawer to form an expensible enclosure outside of the housing providing a light-free environment for the film unit during movement thereof. The transport system also includes means mounted on the drawer for engaging a film unit advanced from the housing by the pressure-applying rollers and returning the film unit into the housing to a storage position therein behind the exposure position of the film unit when the drawer is retracted into the housing.

In the preferred form of the camera shown and described in the aforementioned Erlichman application, the drawer includes means for driving the film advancement means as the drawer is extended outward. The operation of the camera is substantially automatic with the film transport system, the film advancing means and the film processing means being driven by a motor operated, for example, by a battery within the apparatus.

Apparatus of the type described is preferably incorporated as an integral part of a camera including an exposure system, e.g. a shutter, having at least a component required to be moved to a preset position prior to exposure. In this case, the motor provided to drive the film advancement means, transport system and processing means (rollers), is also required to preset the exposure system in readiness to make an exposure.

It will be apparent that the power requirements for such a motor driven camera may be so substantial as, in the case of a battery operated motor, to require a relatively large and bulky battery and that such a battery will increase the size of the camera. An alternative, preferred in order to achieved the smallest and most compact camera structure, is to power the camera motor by a relatively small battery. However, such a battery will require more frequent replacement and this may be accomplished easily and conveniently by providing the battery as a component of each film pack, e.g. assemblage of eight or ten film units. Although the provision of a battery in each film pack will accomplish the objective of a compact camera structure, it also means that the cost of each film pack will be increased significantly.

Objects of the invention are: to provide a novel and improved camera of the type described adapted to be operated manually; to provide a manually operated camera as described including a drawer which is reciprocated manually and is coupled with the other components of the apparatus including the film advancement means and pressure-applying rollers, for automatically driving and coordinating the operation thereof; and to provide a manually operated camera of the type described wherein manual reciprocation of the drawer is effective to preset the exposure control system of the camera in readiness for making an exposure.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is an elevational view, partially in section, of the camera of FIG. 1, the section being taken substantially midway between the sides of the camera;

FIG. 4 is a fragmentary, sectional view similar to FIG. 2, showing the camera with the components thereof in one operative position;

FIG. 5 is a view similar to FIG. 4, showing the components of the camera in another position to illustrate the operation thereof;

FIG. 7 is a fragmentary, sectional view taken substantially along the line 7—7 of FIG. 4;

FIG. 8 is a plan view showing the construction and operation of the camera;

FIGS. 9 and 10 are fragmentary, elevational, sectional views illustrating the structure and operation of components of the camera; and FIG. 11 is a fragmentary perspective view of a portion of the camera.

Figure 1:
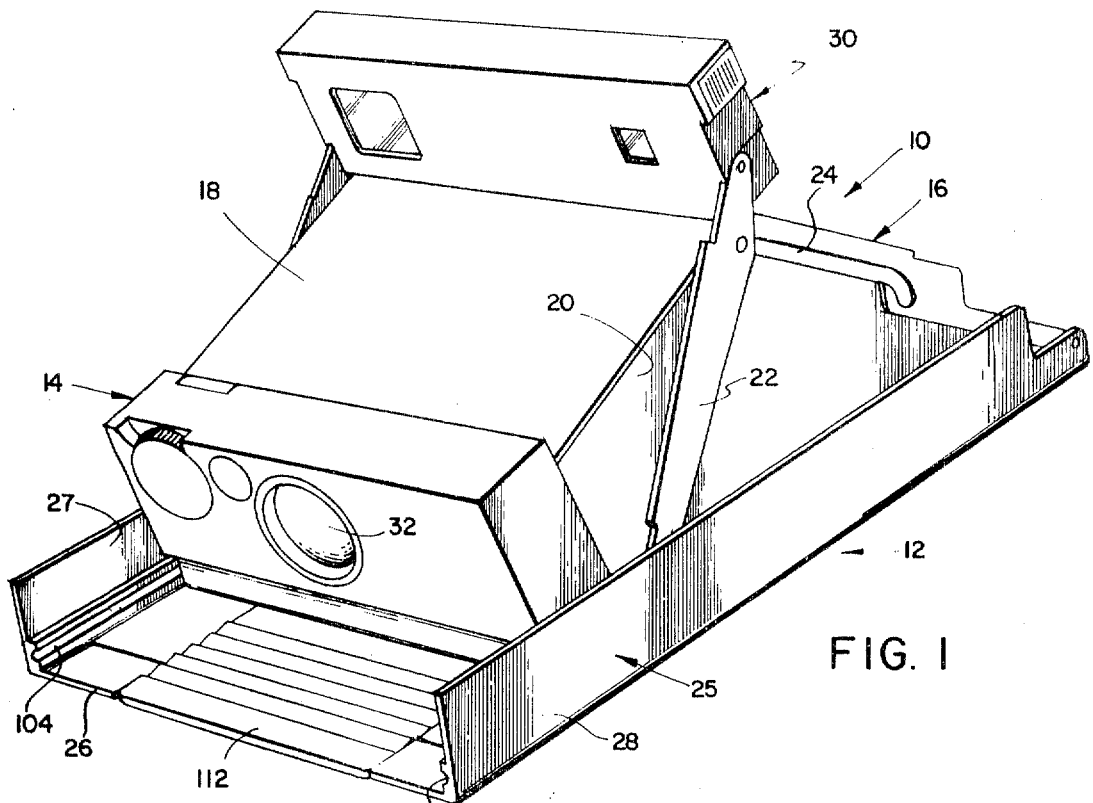
FIG. 1 is a perspective view of photographic apparatus in the form of a folding camera embodying the invention.

Reference is now made to FIGS. 1, 2, 4 and 7 of the drawings wherein there is illustrated photographic apparatus in the form of a folding, self-developing camera embodying the invention. It should be understood that the present invention is concerned, in part, with those components of the camera which hold the film in position for exposure and then process the film so that the structures embodying these components may take other forms such as film holders or camera backs adapted for use with independent exposure systems that can be separated from the film holding and processing unit. The present invention is also concerned with a camera including an exposure system and the cooperation between the exposure system and the film processing components of the camera.

Although the camera, designated 10, is shown as a folding camera, it will be appreciated that the camera may also be of the non-folding type. Camera 10 is shown in the drawings in an erect or operative position and includes a rear or main housing section generally designated 12; a forward housing section 14 for mounting and enclosing an exposure system including, for example, a lens and shutter; a rear cover panel 16; and a forward cover panel 18. The forward housing section is pivotally mounted on the main housing section near one end thereof and the rear cover panel is pivotally mounted on the main housing section at the opposite end thereof. The camera includes a flexible envelope or bellows 20, coupled with the main and forward housing sections and rear cover panel 16 to provide a light-tight chamber through which light is transmitted from the camera lens to a photosensitive element positioned for exposure in the rear housing section. Forward cover panel 18 is pivotally connected at opposite ends to forward section 14 and rear cover panel 16 and functions as a component of the erecting system as well as a cover or wall for protecting components of the camera including bellows 20 when the camera is in a folded position.

The erecting system for the camera includes a pair of links 22 each pivotally mounted near one end on the main housing section and engaged near its opposite end in a slot or channel 24 in one side of rear cover panel 16. Links 22 coooperate with the rear housing section and rear cover panel in the erect position of the camera to form a rigid triangular structure which effectively prevents motion of the rear cover panel relative to the main housing section. The coupling of the forward housing section and forward cover panel with one another and with the rigidly maintained rear housing section and rear cover panel effectively maintains the exposure system within the forward housing section in fixed position relative to the other components of the camera. Folding the camera involves pivoting the forward housing section and the rear cover panel in the same direction (counter-clockwise viewing FIG. 2) rearwardly while displacing forward cover panel 18 rearwardly to form a relatively shallow, rectilinear structure.

The rear or main housing section includes an outer housing or cover 25 comprising a rear wall 26 and two forwardly extending side walls 27 and 28. The forward housing section 14 and rear cover panel 16 are mounted between side walls 27 and 28 and, together with the other components of the camera, are adapted to be rotated between the side walls when the camera is in its folded position. The camera is shown as including a combined view and range finder 30 which may be of a conventional type, pivotally mounted on the free ends of links 22 and moveable from the erect position shown in FIG. 1 to a folded position in which the view finder seats in a recess defined by rear cover panel 16 and side walls 27 and 28.

The optical components of the camera exposure system include an objective lens 32, which may be of a conventional type, and a mirror 34 mounted on the inside of rear cover panel 16 in position, when the camera is erected, for directing light from lens 32 toward a photosensitive element positioned for exposure within the main or rear housing section 12.

Main housing section 12 includes, in addition to outer housing 25, a frame or chassis 36 (see FIG. 6) constituting the main structural component of the camera on which the other components thereof are mounted. Frame 36 includes two side members 38 and 40, a transverse connecting member 42 joining side members 38 and 40 at one end, and a transverse connecting member 44 joining side members at the opposite ends. Bellows 20 is attached to frame 36 and the latter is adapted to support a photosensitive element in position for exposure.

The camera of the invention is designed to be employed with a photosensitive film assemblage or film pack of the type disclosed in the co-pending U.S. patent application of Irving Erlichman, Ser. No. 13,623 filed Feb. 24, 1970, entitled Film Container. The film pack (best seen in FIGS. 4 and 7) includes a container 46 enclosing a plurality of photographic, self-developing film units 48 of the type disclosed, for example, in the copending U.S. patent application of Edwin H. Land et al., Ser. No. 622,286, filed Mar. 10, 1967, now abandoned, and U.S. patents of Edwin H. Land Pat. Nos. 3,415,644, 3,415,645, and 3,415,646, dated Dec. 10, 1968. Each film unit includes an opaque, sheet-like photosensitive element 50 and a transparent sheet-like, image-receiving element 52, secured in face-to-face relation and a rupturable container 54 of processing liquid attached to the elements near the leading edges of the areas of the elements adapted to be exposed and processed. The structure and composition of the photosensitive and image-receiving elements and of the liquid contents of the container are preferably designed to produce a visible, transfer image between the elements by a diffusion transfer process initiated by distribution of the liquid contents of the container between the photosensitive and image-receiving elements. The film container of the film pack is in the form of a box including a rectangular rear wall 56, tapered side walls 58, a forward wall 60, and a leading end wall 62. The forward wall 60 is provided with a rectangular exposure opening 64 for admitting light into the container. A plurality of film units 48 are arranged in stacked relation within the container with the image-receiving element of each facing the forward wall. A spring and pressure plate assembly 66 is provided between the rearmost film unit and rear wall 56 for urging the stack of film units forwardly and supporting the forwardmost film unit in position for exposure against the inner (rear) surface of forward wall 60.

Frame 36 is designed to hold film container 46 with the photosensitive element of the forwardmost film unit within the container located in position for exposure to light from lens 32 reflected by mirror 34 toward the photosensitive element. Proper positioning of the film container is achieved by providing channels 67 on the sides of members 38 and 40 facing one another, adapted to receive rails 68 on the side walls of film container 46. Resilient means such as a detent 84 are provided for releasably retaining the film container in exposure position. For details of the construction of frame 36 and film container 46 and the cooperation therebetween, reference should be had to the aforementioned Erlichman Ser. No. 13,623 application.

A film pack is loaded into the camera by introducing the rails on the sides of the film pack container into channels 67 and sliding the film pack toward the leading end thereof, that is, the end from which film units are withdrawn for processing. In order to facilitate loading of a film pack into the camera, outer housing 25 is mounted on the inner frame for pivotable movement relative to the inner frame between the closed position shown in FIGS. 1 and 3 and the open position shown in FIG. 2. A conventional latch such as shown at 86 is provided for retaining the outer housing in the closed or operative position thereof.

Each photographic film unit 48 is adapted to be processed by advancing the film unit, leading end foremost, from container 46 and thence between a pair of pressure-applying members which compress the container to eject its fluid contents between the superposed elements near the leading edge of the exposed area of the photosensitive element and distribute the liquid toward the trailing end of the film unit as a thin layer contacting the exposed area of the photosensitive element. Leading end wall 62 of film container 46 is formed with an exit slot 70 adjacent forward wall 60 through which the forwardmost film unit is advanced from the container following exposure of the film unit. The photosensitive element may remain sensitive to actinic light during some period immediately following distribution of the processing liquid within the film unit so that it is required to be maintained in a light-free environment at least during the initial portion of the processing period.

The camera includes processing means in the form of a pair of juxtaposed rollers 72 and 74, mounted on frame 36 with their axes located substantially in a common plane. Roller 72 is mounted in a fixed position preferably with its axis at the pivotal axis of forward housing section 14 and roller 74 is mounted for movement with respect to roller 72 and is biased toward roller 72 by resilient means (not shown) in order to accommodate the varying thickness of the film unit.

Figure 6:
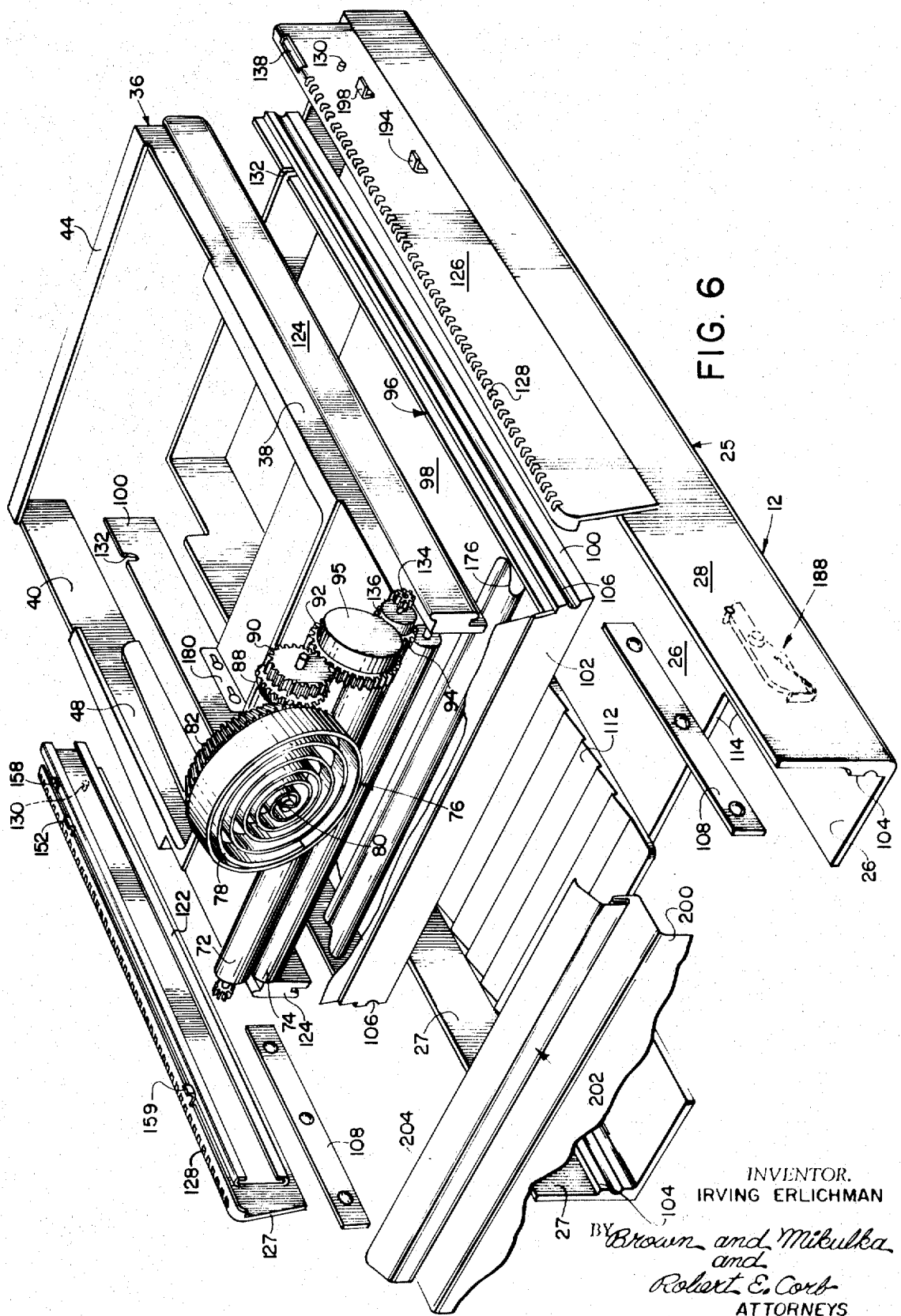
FIG. 6 is an exploded, perspective view of components of the camera.

In accordance with the invention, the camera includes means for rotating the rollers in juxtaposition to advance a film unit between the rollers while applying compressive pressure to the film unit to eject and spread the fluid contents of the container between the photosensitive and image-receiving elements. The means for rotating the rollers preferably comprise a conventional spring motor 76 enclosed within forward housing section 14. Spring motor 76 is illustrated in FIGS. 6 and 11 of the drawings as including a flat spring 78 coiled around a fixed shaft 80. Attached to the end of spring 78 that is free to rotate, is a bevel gear 82 mounted for rotation on shaft 80. Spring motor 76 is coupled to roller 72 by a transmission including a bevel gear 88 meshed with bevel gear 82 and attached to a spur gear 90 meshed with another spur gear 92 in turn meshed with a gear 94 attached to the shaft on which roller 72 is mounted.

The thickness of the layer of processing liquid spread between the elements of each film unit by moving the film unit between the processing rollers is a function of the speed of advancement of the film unit relative to the rollers. Thus, to insure consistent and uniform processing of successive film units, the speed of rotation of roller 72 should be controlled. For this purpose a speed governing device 95 is coupled with gear 92 for controlling the speed of rotation of the gear by the spring motor. Governor 95 may be of any conventional, mechanical type and may include for example, an escapement mechanism. A governor of this particular type may be desirable because of the additional advantage of being adjustable to vary the speed as required by other factors such as temperature, viscosity of the processing liquid, and/or changes in the desired spread thickness.

In the operation of the camera, the forwardmost film unit, following exposure thereof, is advanced from film container 46 through slot 70 into the bite of rollers 72 and 74 and is engaged thereby. The rollers are rotated to advance the film unit substantially in a plane in the same direction while ejecting and spreading the fluid contents of container 54 between elements 50 and 52. Rotation of the rollers is initiated just prior to or simultaneously with engagement of a film unit in the bite of the rollers and is continued until the film unit has been advanced completely from engagement with the rollers. At this point, the film unit is then moved in substantially the opposite direction while being guided such that the trailing end of the film unit passes behind roller 74 and behind the film pack container 46. Provision is made for maintaining the film unit in a light-free environment to prevent exposure of the photosensitive element by ambient light during the described reciprocating movement of the film unit.

In accordance with the invention, the camera includes manually operated means for moving the film unit from exposure position into the bite of the processing rollers, for engaging the film unit after it has been advanced from between the pressure-applying rollers and then returning the film unit to a storage position behind the film pack within rear housing section 12 while for enclosing the film unit in a light-free environment during and following the aforementioned processing and manipulative operations. These means are illustrated in FIGS. 4 through 10 as including a drawer 96 having a rear wall 98, dependent side walls 100 and a leading end wall 102. Drawer 96 is mounted for reciprocating movement within and relative to main housing section 12 with rear wall 98 of the drawer located adjacent rear wall 26 of outer housing 25 and side walls 100 of the drawer located adjacent side walls 27 and 28 of the outer housing.

The camera includes ball bearing means for mounting the drawer for reciprocating movement, comprising ball bearing guides 104 on side walls 27 and 28 of the rear housing section and ball bearing guides 106 on side walls 58 of the drawer. The ball bearing guides include grooves for engaging balls designated 110. Retaining elements 108 having openings therein for receiving the balls, are provided for preventing escape of the balls from grooves 104 and 106.

Drawer 96 is mounted for reciprocating motion between an initial position, shown in FIGS. 1 and 4, in which the drawer is located with the rear housing section with the side walls of the drawer located between side walls 27 and 28 of the rear housing section and side members 38 and 40 of frame 36 and end wall 102 of the drawer located adjacent roller 74; and a second or extended position, shown in FIG. 5 in which the drawer is extended outwardly from the camera housing a distance approximately equal to the length of a film unit 48. The drawer, in the extended or second position, is adapted to receive and support an exposed film unit 48 as the latter is advanced between rollers 72 and 74. The drawer is then returned to its initial position to return the exposed and processed film unit to the rear housing section of the camera into a storage position behind the film pack container 46 between the latter and rear wall 26 from whence the processed film unit can be removed from the camera housing when processing has advanced at least to the stage at which the film unit is no longer sensitive to light. A door 111 is provided in rear wall 26 to facilitate removal of processing film units from the camera.

In accordance with the invention, drawer 96 includes means for enabling the drawer to be reciprocated manually to drive not only the drawer, but other film handling components of the camera including processing rollers 72 and 74, the means for feeding film units from exposure position into the bite of the rollers and the shutter of the camera. In the embodiment shown in FIGS. 1, 2, and 4 through 8, the means for enabling manual reciprocation of the drawer include a manually engageable tongue 112 secured to the rear wall of the drawer at the leading end thereof and extending forwardly in substantially the same plane as rear wall 26. Rear wall 26 is formed with an indentation 114 for receiving tongue 112 in the initial position of the drawer so that the rear surface of the tongue will lie in the plane of the rear surface of rear wall 26 and provide a substantially continuous rear wall for the camera housing. The forward surface of tongue 112 is serrated or grooved to facilitate gripping of the tongue to draw the drawer from its initial position into its second or intermediate position and then return the drawer to its initial position.

Figure 3:
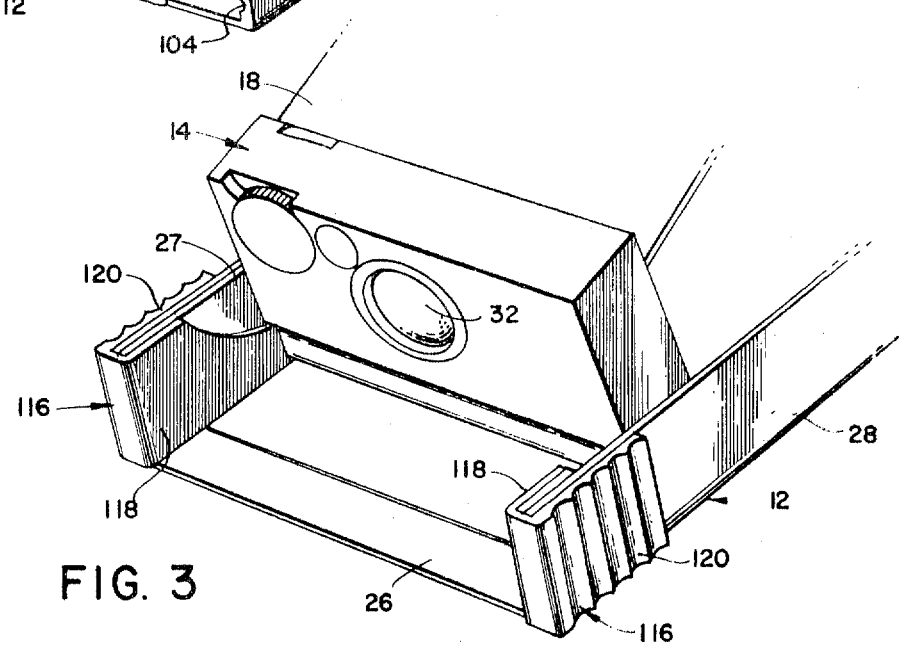
FIG. 3 is a fragmentary, perspective view similar to FIG. 1, showing another embodiment of the camera.

Alternative means for enabling manual reciprocation of the drawer are illustrated in FIG. 3 of the drawings as comprising a pair of U-shaped engagement members 116, each having a first section 118 secured to the leading end of the drawer and extending forwardly closely adjacent one of side walls 27 and 28 of outer housing 25. Members 116 are bent around the forward edges of the side walls and each includes a second section 120 extending in the opposite direction toward the forward housing section closely adjacent and outside of side wall. Second sections 120 are adapted to be gripped for reciprocating the drawer and are suitably serrated or grooved to facilitate manual engagement.

In the operation of the camera following exposure of the photosensitive element of the forwardmost film unit, drawer 96 is withdrawn from its initial position and moved into its second position to initiate processing of the exposed film unit by gripping togue 112 or members 116. During the terminal portion of outward movement of the drawer, rollers 72 and 74 commence to rotate and film feeding means within the rear section of the camera advance the forwardmost film unit from exposure position within the film pack container into the bite of the rollers to continue the advancement of the film unit in the same direction and substantially in a plane into the extended drawer while distributing the processing liquid within the film unit. Rotation of the processing rollers and advancement of the film unit into the bite of the rollers are initiated during the terminal portion of the manual movement of the drawer into its extended position in order to insure that the drawer will be extended sufficiently to permit unimpeded movement of the film unit completely between the rollers into the drawer.

The spring motor which drives the rollers is adapted, in the embodiment shown, to be wound or tensioned during return movement of the drawer into its initial position. The camera includes means for transmitting the force, applied to the drawer during return movement to the initial position, to the spring motor to wind the motor. These same means are also adapted to initiate rotation of the rollers at the proper time to feed a film unit from exposure position into the bite of the rotating rollers and to preset the shutter mechanism in readiness to make an exposure. These transmission means are shown in FIGS. 6 through 11 as including a pair of channels 122 having C-shaped cross-sections each mounted for sliding movement in engagement with a T-shaped track 124 on a side member 38 of chassis 36; and a pair of racks 126 and 127 each secured to the outside of a channel 122 and having a flange 128 formed with teeth adapted to mesh with spur gears. Racks 126 and 127 are coupled for reciprocating movement with the drawer by studs 130 on the racks adapted to engage notches 132 in side walls 100 of the drawer near the trailing end thereof. It will be apparent that although racks 126 and 127 are moved by drawer 96, the linear paths of movement of the racks diverge slightly from the linear path of movement of the drawer, hence the stud and notch coupling between the racks and drawer. The paths of movement of the racks and drawer are divergent because the racks are mounted on the inner frame and move relative to gears or pinions rotated about the axis of roller 72 in a plane parallel with the plane of movement of the film units between the spread rolls which, in turn, is generally parallel with the forward wall of the film pack container. The rear wall of the drawer is adapted to move between the rear wall of the film pack container and the rear wall of the camera housing which are not parallel with the forward wall, but diverge toward the leading end of the film pack to accommodate the additional thickness of containers 54 of the processing liquid. The stud and notch coupling between the drawer and racks also permits the outer housing 25 on which the drawer is mounted to be pivoted to an open position relative to the chassis 36 on which the racks are mounted.

The transmission means for tensioning spring 78 of motor 76 during return movement of the drawer into the camera housing includes a pinion 134 engaged with the teeth on rack 126 and coupled to gear 94 through a conventional overrunning or one-way clutch 136. The overrunning clutch 136 is provided in the transmission to permit the drawer to be moved outwardly from its initial position into an extended position without driving the transmission in a direction tending to unwind the spring motor. In order to enable the motor to rotate roller 72 while the drawer remains stationary in an extended position, a toothless gap 138 is formed in the flange 128 of rack 126 near the end of the rack thus providing a space in which the teeth of pinion 134 are disengaged from the rack leaving pinion 134 free to rotate together with roller 72 during advancement of a film unit between the rollers. During return movement of the drawer and rack from their extended position to their initial position, the teeth on rack 126 reengage pinion 134 rotating the pinion, roll 72 and winding motor 76. At this stage in the operation, the film unit is no longer engaged between the rollers and rotation of roller 72 performs no function and requires little energy.

As previously noted the camera includes means for advancing an exposed film unit from exposure position within the film pack container through slot 70 into the bite of rollers 72 and 74. These means include a film engagement member 140 mounted for reciprocating movement on connecting member 42 and extending rearwardly through a slot 142 in the connecting member located closely adjacent side member 40. Engagement member 140 is adapted to extend through a slot 144 in forward wall 60 of film container 46 into engagement with a hole or recess formed in the portion of the film unit, e.g. container 54, underlying the leading end portion of forward wall 60. The forwardmost film unit is advanced into the bite of processing rollers 72 and 74 by moving film engagement member 140 in engagement with the forwardmost film unit toward the rollers.

The camera includes means for moving film engagement member 140 toward the processing rolls during the terminal portion of movement of the drawer and racks into their extended position. These means include a first lever 146 mounted for pivotal movement on connecting member 42 near the side thereof closest side member 38 with the free end of lever 146 located behind (in the direction of film movement) and in engagement with film engagement member 140. A second lever 148 is pivotally mounted at one end on connecting member 42 adjacent the same location as lever 146 is pivoted and extends adjacent lever 146 toward the opposite side of frame 36 ahead of film engagement member 140, so that film engagement member is located between levers 146 and 148. A spring 150 is engaged with levers 146 and 148 for pivotally biasing the levers in opposite directions toward one another so as to grip the film engagement member between the end portions of the levers.

Rack 127 is formed with a lug 152 located near the trailing end of the rack for engaging the free end of second lever 148 during the terminal portion of movement of the rack into its extended position to pivot lever 148 in a counter-clockwise direction (viewing FIG. 8) toward the pressure-applying rollers. A latch 154, shown in FIG. 9, is pivotally mounted on side member 40 for engaging lever 146 to prevent counter-clockwise rotation of the lever in response to the bias exerted thereon by spring 150. A spring 156 is provided for pivoting latch 154 forwardly (counter-clockwise) into engagement with lever 146. A lug 158 is provided on rack 127 near the trailing end of the rack for engaging a cam 160 on latch 154 to pivot the latch (clockwise) from engagement with lever 146 as the drawer and rack 127 reach their extended position. Thereupon lever 146 is free to pivot toward the processing rollers, under the bias of spring 150 moving film engagement member 140 toward the rollers in engagement with the forwardmost film unit.

Means are provided for returning film engagement member 140 to its initial position in readiness to advance the next succeeding film unit into the bite of the processing roller. These last mentioned means include a lug 159 on rack 127 near the forward or leading end of the rack for engaging the end section of second lever 148, during return movement of rack 127, and pivoting lever 148 in a clockwise direction. Lever 148, in turn, pushes against film engagement member 140 causing the latter to engage and pivot first lever 146 in a clockwise direction until the latter has moved past latch 154 and is engaged thereby.

The spring motor is wound or tensioned during return movement of the tray to its initial position so that the camera is in readiness to expose and process a film unit. Control means are provided for retaining the spring motor in a tensioned or wound condition until the drawer has been extended following exposure of a film unit and then releasing the motor drive to rotate roller 72 at about the same time a film unit is fed into the bite of rollers 72 and 74. These control means include ratchet teeth 162 on the outer portion of overrunning clutch 136 coupled with gear 94 and roller 72 and a resilient latch member 164 biased into engagement with the ratchet teeth for preventing clockwise (viewing FIG. 11) rotation of gear 94 and roller 72. An edge portion of latch member 164 is bent to form a cam 166 adapted to be engaged by a lug 168 mounted on rack 126 near the trailing end thereof for disengaging latch member 164 from ratchet teeth 162 during the terminal portion of travel of the drawer and racks into an extended position.

The camera includes control means for limiting the travel of the drawer into the extended position and preventing return movement of the drawer until after a film unit has been advanced between and beyond the processing rollers into the drawer. These control means (shown in FIG. 10) include a spring latch 170 mounted on rear wall 26 of outer housing 25, and biased forwardly into position to become engaged, an opening 172 in rear wall 98 of drawer 96 as the drawer is moved into its second or extended position. Means are provided within the drawer for gripping the leading end portion of the film unit as it is advanced from between the processing rollers and then deflecting the trailing end of the film unit rearwardly so that when the drawer is returned to its initial position, the film will pass behind roll 74 and between the film pack container and rear wall 26 of the outer housing. These last mentioned means comprise an elongated cantilever spring 174 having a free end section 176 bent upon itself to form a U-shaped clip for receiving and engaging the leading end of a film unit. The opposite end section of spring 174 is bent upon itself to form a U-shaped end section 178 including portions located forward of and behind the trailing end section of rear wall 98. Spring 174 is mounted on side wall 100 of drawer 96 and for this purpose includes a flange 180 having slots 182 engaged for sliding movement with headed studs 184 on side wall 100 of the drawer. Spring 174 is biased away from the rear wall 98 of the drawer so that end section 176 of the spring is located in the path of movement of the leading end of a film unit advanced by rollers 72 and 74; and is formed so that the spring tends to deflect the trailing end of the film unit rearwardly toward the rear wall of the drawer. A guide spring 186 is mounted between roller 74 and the leading end wall 62 of film pack container for guiding the film unit between the rear wall 56 of the film pack container and the rear wall 26 of the camera housing during return movement of the drawer, spring 174 and film unit retained thereby.

As previously noted, the drawer is moved from an initial position to a second or extended position through a distance approximately equal to the length of a film unit at which position the movement of the drawer is arrested by engagement of spring latch 170 in recess 172 in the drawer. At this position the spacing between end section 176 and the bite of rollers 72 and 74 is less than the length of a film unit so that as the film unit is advanced by rollers 72 and 74 into engagement with end section 176 of spring 174, the spring will be moved by the film unit in the direction of extension of the drawer. As a result of this movement the portion of end section 178 located behind rear wall 98 of the drawer between the latter and rear wall 26 engages spring latch 170 deflecting it rearwardly from engagement with opening 172 so that the drawer is free to move outwardly beyond the second or extended position thereof. The purpose of this additional outward movement of the drawer is twofold: first, the trailing end section of the film unit is moved beyond the bite of the rollers so that the film unit is free to move rearwardly so as to pass behind roller 72 when the drawer is returned to its initial position; and secondly, the camera includes a control mechanism preventing return movement of the drawer prior to completion of the outward movement of the film unit, which control mechanism is released to permit return movement of the drawer in response to the further extension thereof from the second (extended) position. To insure further extension of spring 174 and advancement of the film unit engaged thereby during the additional extension of the drawer, a spring detent member 222 is mounted in side wall 100 of the drawer for engaging a cam 224 on spring 174 as the latter is moved outwardly during advancement of the film unit by the processing rollers. When the drawer is returned to its initial position means (not shown) in the camera arrest movement of spring 174 while the drawer is still in motion thereby returning spring 174 to its original position disengaging cam 224 and spring 222.

The aforementioned mechanism for preventing premature return movement of the drawer includes a latch lever 188 pivotally mounted intermediate its ends on side wall 28 of outer housing 25 between the latter and rack 126. Lever 188 is mounted in frictional engagement with wall 28 such that the lever tends to remain in any position at which it is located and is shown in FIG. 9 as being in a latch position against a stop 190 in which the lever has been pivoted as far as possible in a clockwise direction. Mounted on the end of lever 188 close to the processing rollers is a V-shaped cantilever spring 192 adapted to engage a lug 194 mounted on rack 126 in position to prevent return movement of the rack and drawer attached thereto. The rear edge 196 of lever 188 functions as a cam surface adapted to be engaged by a lug 198 on rack 126 for retaining the latch lever 188 in latching position as a lug 194 is moved past spring 192 deflecting the spring which is adapted to return behind lug 194 and prevent return movement of the drawer. When the drawer is further extended from its second position following advancement of a film unit into the drawer, lug 198 engages rear edge 196 of the latch lever pivoting the latter in a counterclockwise direction out of the path of return movement of lug 194. During return movement of the drawer to its initial position lug 198 engages rear edge 196 of latch lever 188 pivoting the latter in a clockwise direction into its latching position against stop 190.

It will be seen from the foregoing that during the operation of the camera to process a photographic film unit, return it to the camera housing and wind the spring motor in readiness to process a subsequent film unit, the operator need maintain a slight tension on the drawer during the fraction of a second that it takes for the camera to advance a film unit between the processing rolls into the drawer and thereby release the drawer to move a relatively small distance outwardly where the drawer again comes to a stop. The operator then pushes the drawer inwardly to return the film unit to the housing and wind the spring motor.

The camera includes means cooperating with drawer 96 to form an expansible light-tight enclosure for each film unit as the latter is advanced from between processing rollers 72 and 74. These last mentioned means comprise a curtain 200 formed of a thin, flexible, light-opaque material having a width approximating the space between racks 126 and 127. Curtain 200 is attached at one end to a support member 202 extending from side to side of outer housing 25. Support member 202 includes a resilient edge portion 204 for engaging forward housing section 14 and forming a light-tight seal across the gap between the housing and pressure-applying roller 72. Curtain 200 extends from support member 202 around a first guide roller 206 mounted at its ends on the ends of racks 126 and 127 closely adjacent flanges 128 on the racks at the leading ends thereof; thence around and behind a second guide roller 208 mounted at its ends within drawer 96 adjacent rear wall 98 and end wall 102 of the drawer; then toward the trailing end of the drawer around a third guide roller 210 at the trailing edge of rear wall 98 of the drawer; and then between wall 98 of the drawer and rear wall 26 of the camera housing to a position to the rear of the pressure-applying rollers where the curtain is secured to rear wall 26. A slot is provided in curtain 200 for accommodating U-shaped end section 178 of spring 174.

In the operation of the camera, as the drawer is moved outwardly from its initial position shown in FIG. 4 to its extended position shown in FIG. 5, the lateral edges of the curtain are engaged between the flanges 128 on racks 126 and 127 and C-shaped channels 122 secured to the racks to form a light-tight engagement with the racks as they move together with the drawer into the extended position. The edge portions of the curtain engaged with the racks, cooperate with the racks and drawer to form a light-tight chamber or enclosure bounded by a forward wall provided by the curtain which also forms a portion of the end wall of the chamber. During reciprocating motion of the drawer between the initial and extended positions thereof, the curtain may be maintained under a slight tension although it is not required to stretch, is preferably inelastic and is required only to be flexible, thin and opaque.

As previously noted, the camera may include a shutter, the details of which have been omitted from the drawing, of the type required to be preset prior to making an exposure and manual movement of the drawer is effective to preset the shutter. Shutters of this type are conventional and for details of a typical shutter of this type adapted for incorporation in the camera of the invention, reference may be had to the copending U.S. patent application of Lawrence M. Douglas, Ser. No. 837,682, filed June 30, 1969. The shutter includes a double spiral grooved winding cam 212 adapted to pivot a lever 214 and effect the linear movement of a link 216, both the lever and link being attached to cam followers engaged in the grooves of the winding cam. Pivotal movement of lever 214 and sliding movement of link 216 is effective, as described in the Douglas application, to cock and/or preset the shutter mechanism in readiness to make an exposure. The winding cam is rotated by and in response to reciprocating movement of the drawer and may be designed to preset the shutter during either or both extension and retraction of the drawer. In the preferred embodiment, the shutter is preset during extension of the drawer and for this purpose the camera is provided with a pinion 218 meshed with the teeth on rack 127 with a second pinion 230 coupled with the winding cam. If it is desired to rotate the winding cam only during movement of rack 127 in one direction, pinion 230 may be coupled with winding cam through a conventional overrunning clutch.

It will be appreciated from the foregoing description that the photographic apparatus of the invention provides a manually operated, self-developing camera having unique and unexpected advantages. The camera of the invention makes it unnecessary for the operator to handle the photographic materials, i.e., film, during processing and provides a processing system which, although manually driven, is substantially automatic in its operation so that processing of successive film units is consistent and not subject to variation due to the operator. Operation of the camera is simple and requires only that the operator, after making an exposure, grip and withdraw a drawer from the camera until movement of the drawer is arrested at which point the operator hesitates for a moment. withdraws the drawer a slight distance further and then pushes the drawer back into the camera housing. Thereafter, at the end of a relatively short processing period, the operator may open a door at the rear of the camera and remove a processed film unit, preferably constituting a completed photographic print. Withdrawing and returning the drawer is also effective to preset the camera shutter in readiness to make an exposure so that in the case of a photoelectrically controlled shutter, the operator need only aim the camera at the subject and release the shutter to make an exposure.

It should be apparent that various modifications can be made to the camera of the invention and still fall within the scope thereof. For example, provision may be made within the camera housing at the rear of the drawer for storing a plurality of processed film units. In an alternative embodiment, the drawer may be constructed (as shown and described in U.S. patent application Ser. No. 880,794, filed Nov. 28, 1969) to return each processed film unit to the rear of the film pack container from whence it was withdrawn so that one or more processed film units may be stored within the film pack so that there is no necessity for enlarging the camera to provide storage space for the film units.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including means for locating a photosensitive element in position for exposure, processing means for engaging and advancing a photosensitive element in a first direction to an intermediate position and during advancement of said photosensitive element into said intermediate position, distributing a processing liquid in contact with said photosensitive element, and advancement means for engaging and moving a photosensitive element in said first direction from exposure position into engagement with said processing means, in combination:

transport means mounted for movement substantially in said first direction from a first to a second position and for return movement in a second direction substantially opposite to said first direction, said transport means being adapted, when in said second position, to engage and support a photosensitive element advanced by said processing means into said intermediate position and being constructed to move said photosensitive element substantially in said second direction from said intermediate position into a terminal position during return movement of said transport means in said second direction;

manually engageable means for moving said transport means in said first and second directions; and drive means coupled with said processing means and said transport means for operating said processing means to advance a photosensitive element in said first direction into said intermediate position thereof and distribute a processing liquid in contact with said photosensitive element in response to manual movement of said transport means in at least one of said first and second directions.

2. Photographic apparatus as defined in claim 1 including exposure means required to be preset prior to making an exposure and means coupled with said exposure means and said transport means and responsive to movement of the latter for presetting said exposure means in response to movement of said transport means.

3. Photographic apparatus as defined in claim 2 wherein the last-mentioned means are coupled with said exposure means for presetting the latter in response to movement of said transport means in said first direction.

4. Photographic apparatus as defined in claim 2 wherein the last-mentioned means are coupled with said exposure means for presetting the latter in response to return movement of said transport means.

5. Photographic apparatus as defined in claim 1 wherein said drive means include energy storage means coupled with said transport means accepting and storing energy during and in response to manual movement of said transport means in one of said first and second directions.

6. Photographic apparatus as defined in claim 5 wherein said energy storage means include a spring coupled with said transport means by transmission means constructed to tension said spring in response to movement of said transport means in said second direction.

7. Photographic apparatus as defined in claim 1 wherein said transport means includes means defining a variable volume chamber for enclosing a photosensitive element in a light-free environment during movement of said photo-sensitive element in said first and second directions.

8. Photographic apparatus as defined in claim 1 wherein said drive means include a governor for controlling the speed of advancement of a photosensitive element by said processing means.

9. Photographic apparatus as defined in claim 1 including control means for releaseably restraining said transport means against movement from said second position thereof until a photosensitive element has been advanced by said processing means into said intermediate position of said element.

10. Photographic apparatus as defined in claim 9 wherein said control means are responsive to advancement of a photosensitive element into said intermediate position for releasing said transport means for movement from said second position.

11. Photographic apparatus as defined in claim 10 wherein said control means include means mounted on said transport means in the path of movement of a photosensitive element in said first direction and responsive to engagement by the photosensitive element for releasing said transport means for movement.

12. In photographic apparatus including means for locating a photosensitive element in position for exposure, processing means for engaging and advancing a photosensitive element in a first direction to an intermediate position and during advancement of said photosensitive element into said intermediate position, distributing a processing liquid in contact with said photosensitive element, and advancement means for engaging and moving a photosensitive element in said first direction from exposure position into engagement with said processing means, in combination:

transport means mounted for movement substantially in said first direction from a first to a second position and for return movement in a second direction substantially opposite to said first direction, said transport means being adapted, when in said second position, to engage and support a photosensitive element advanced by said processing means into said intermediate position and being constructed to move said photosensitive element substantially in said second direction from said intermediate position into a terminal position during return movement of said transport means in said second direction;

manually engageable means for moving said transport means in said first and second directions;

energy storage means coupled with said transport means for accepting and storing energy during and in response to manual movement of said transport means in at least one of said first and second directions; and transmission means coupled with said processing means and said energy storage means and responsive to release of energy stored by the latter for operating said processing means to advance a photosensitive element in said first direction into said intermediate position thereof and distribute a processing liquid in contact with said photosensitive element.

13. Photographic apparatus as defined in claim 12 including exposure means required to be preset prior to making an exposure and means coupled with said exposure means and said transport means and responsive to movement of the latter for presetting said exposure means.

14. Photographic apparatus as defined in claim 13 wherein the last-mentioned means are coupled with said exposure means for presetting the latter in response to movement of said transport means in said first direction.

15. Photographic apparatus as defined in claim 13 wherein the last-mentioned means are coupled with said exposure means for presetting the latter in response to return movement of said transport means.

16. Photographic apparatus as defined in claim 12 wherein said energy storage means include a spring, and said transport means are coupled with said spring for tensioning said spring in response to movement of said transport means in one of said first and second directions.

17. Photographic apparatus as defined in claim 16 wherein said transmission means are constructed to tension said spring in response to movement of said transport means in said second direction.

18. Photographic apparatus as defined in claim 12 wherein said transport means includes means defining a variable volume chamber for enclosing a photosensitive element in a light-free environment during movement of said photosensitive element in said first and second directions.

19. Photographic apparatus as defined in claim 12 wherein said transmission means include a governor for controlling the speed of advancement of a photosensitive element by said processing means.

20. Photographic apparatus as defined in claim 12 including control means for releasably restraining said transport means against movement from said second position thereof until a photosensitive element has been advanced by said processing means into said intermediate position of said element.

21. Photographic apparatus as defined in claim 20 wherein said control means are responsive to advancement of a photosensitive element into said intermediate position for releasing said transport means for movement from said second position.

22. Photographic apparatus as defined in claim 21 wherein said control means include means mounted on said transport means in the path of movement of a photosensitive element in said first direction and responsive to engagement by the photosentive element for releasing said transport means for movement.

23. Photographic apparatus as defined in claim 12 wherein said transport means include means responsive to movement of said transport means into said second position for actuating said advancement means to move a photosensitive element in said first direction into engagement with said processing members and initiate movement of one of said processing members to move the photosensitive element in said first direction into said intermediate position.

24. Photographic apparatus as defined in claim 23 wherein the last-mentioned means are adapted to actuate said advancement means to move a photosensitive element in said first direction during and in response to the terminal portion of movement of said transport means into said second position and to initiate movement of said one processing member during movement of a photosensitive element by said advancement means substantially simultaneously with arrival of said transport means at said second position thereof.

25. Photographic apparatus as defined in claim 23 including control means releasably restraining said transport means against movement from said second position thereof until a photosensitive element has been moved by said processing means into said intermediate position of said element.

26. Photographic apparatus as defined in claim 23 wherein said control means include means responsive to movement of a photosensitive element into said intermediate position of said element for releasing said transport means for movement from said second position thereof.

27. Photographic apparatus as defined in claim 23 wherein said transport means include means defining a variable volume chamber for enclosing a photosensitive element in a light-free environment during movement of said element in said first and second directions.

28. In photographic apparatus including means for locating a photosensitive element in position for exposure, in combination:
advancement means for moving a photosensitive element in a first direction from exposure position into a second position;
transport means mounted for movement substantially in said first direction and in a second direction opposite to said first direction, for moving a photosensitive element in said second direction from said second position to a terminal position adjacent said exposure position during movement of said transport means in said second direction;
manually engageable means for moving said transport means in at least said second direction;
energy storage means coupled with said transport means for accepting and storing energy during and in response to manual movement of said transport means in said second direction; and
transmission means coupled with said advancement means and said energy storage means, responsive to the release of energy stored by the latter, for actuating said advancement means to move a photosensitive element in said first direction into said second position of said element.

29. Photographic apparatus as defined in claim 28 wherein said advancement means include a pair of juxtaposed processing members for distributing a processing composition in contact with a photosensitive element during movement of said element in said first direction between said members and said transmission means are coupled with at least one of said members for moving the latter to advance a photosensitive element between said members in said first direction.

30. Photographic apparatus as defined in claim 29 wherein said transmission means include a governor for controlling the speed of advancement of a photosensitive element in said first direction between said members.

31. Photographic apparatus as defined in claim 28 wherein said energy storage means include a spring and means for tensioning said spring during and in response to movement of said transport means in said second direction.

32. Photographic apparatus as defined in claim 28 including exposure means required to be preset in order to make an exposure and means coupled with said exposure means and said transport means responsive to movement of the latter for presetting said exposure means.

33. Photographic apparatus as defined in claim 32 wherein said manually engageable means are adapted to move said transport means in said first direction and the last-named means coupled with said exposure means and said transport means are adapted to preset said exposure means during and in response to movement of said transport means in said said first direction.

34. Photographic apparatus as defined in claim 28 wherein said transport means include means defining a variable volume chamber for enclosing a photosensitive element in a light-free environment during movement of said photosensitive element in said first and second directions.

References Cited

UNITED STATES PATENTS

| | | | |
|---|---|---|---|
| 3,350,990 | 11/1967 | Finelli et al. | 95—13 |
| 3,405,620 | 10/1968 | Friedman | 95—13 |
| 3,460,452 | 8/1969 | Land | 95—13 |
| 3,505,939 | 4/1970 | Hu | 95—13 |
| 3,543,661 | 12/1970 | Rosen | 95—39 X |

SAMUEL S. MATTHEWS, Primary Examiner

F. L. BRAUN, Assistant Examiner